United States Patent [19]
Bez

[11] 3,887,223
[45] June 3, 1975

[54] COLLISION ENERGY DISSIPATION APPARATUS FOR A PASSENGER MOTOR VEHICLE

[75] Inventor: Ulrich Bez, Gerlingen, Germany

[73] Assignee: Dr. Ing. h.c.F. Porsche Aktiengesellschaft, Germany

[22] Filed: Dec. 20, 1973

[21] Appl. No.: 426,543

[30] Foreign Application Priority Data
Dec. 20, 1972   Germany............................ 2262293

[52] U.S. Cl.................................... 293/70; 188/1 C
[51] Int. Cl. ............................................ B60r 19/04
[58] Field of Search .... 293/1, 60, 70, 71 R, DIG. 3, 293/85, 86, 88, 89; 213/1 A; 188/1 C

[56] References Cited
UNITED STATES PATENTS

| | | | |
|---|---|---|---|
| 2,135,749 | 11/1938 | Gullo | 293/85 |
| 3,401,576 | 9/1968 | Eckels | 188/1 C |
| 3,508,633 | 4/1970 | Nishimura et al. | 188/1 C |
| 3,610,609 | 10/1971 | Sobel | 293/60 |
| 3,744,338 | 7/1973 | Komatsu et al. | 188/1 C |

Primary Examiner—Evon C. Blunk
Assistant Examiner—Robert Saifer
Attorney, Agent, or Firm—Craig & Antonelli

[57] ABSTRACT

Collision energy dissipation apparatus for a passenger vehicle including tube members enclosing a hollow space for accommodating deformable foam material. In one preferred embodiment, the tube members consist of a cylindrical inner tube member filled with crushable foam and an outer square tube member surrounding the inner tube member and connected thereto by welding or gluing along the tangent points of the outer tube member with respect to the inner tube member. The opposite ends of the respective tube members are closed off by U-shaped girder members, one of which forms a portion of the fixed vehicle frame and the other of which is movable in response to collision forces toward said one member with plastic deformation and relative telescoping movement of the two tube members. Another preferred embodiment utilizes a series of conical members telescopically connected to one another to form the guide and support tube supporting the inner tube member.

28 Claims, 5 Drawing Figures

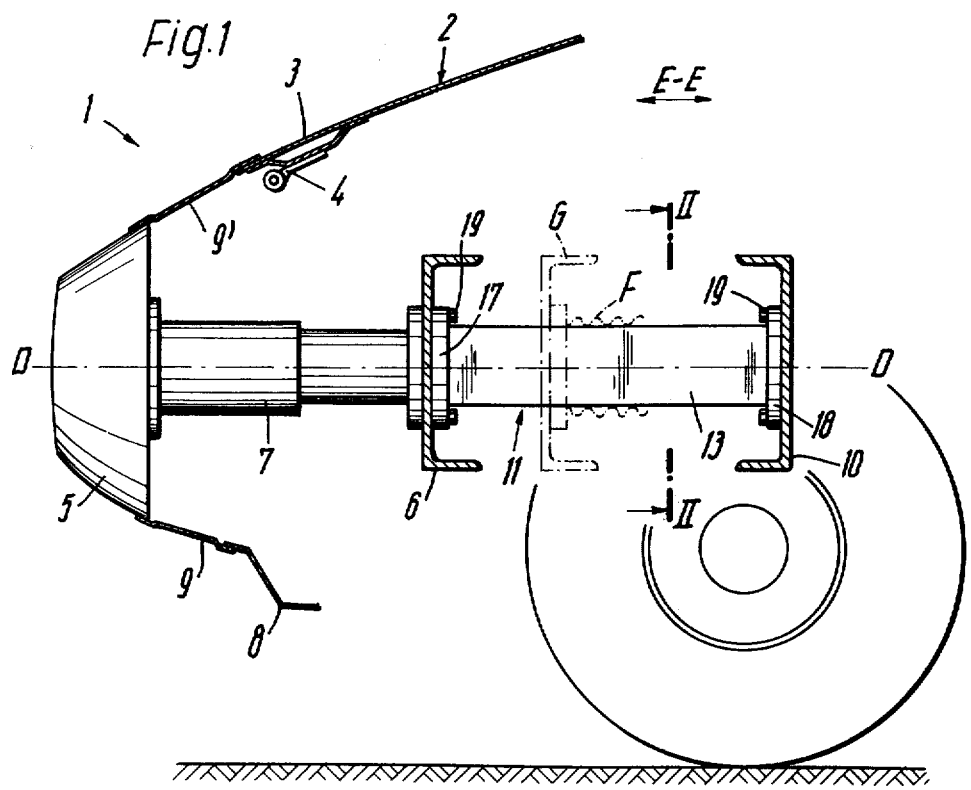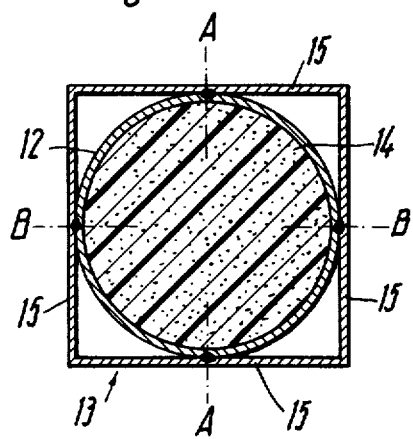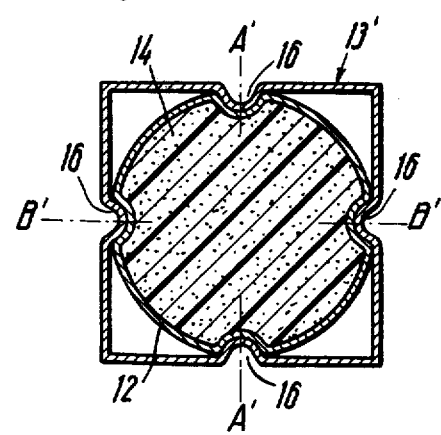

COLLISION ENERGY DISSIPATION APPARATUS FOR A PASSENGER MOTOR VEHICLE

BACKGROUND AND SUMMARY OF THE INVENTION

The present invention relates to collision energy dissipation apparatus for a motor vehicle, especially for passenger motor vehicles. The present invention is specifically directed to an improved arrangement of the type wherein an impulse or collision energy-absorbing device is incorporated into the vehicle body structure. More specifically, the present invention is concerned with such a device of the type having crushable or plastically deformable foam interposed in the force train for absorbing the collision energy by plastic deformation of the foam material.

A motor vehicle has been contemplated (DT-GM 1983 413) which has an energy dissipating element which extends over the vehicle width and between the vehicle bumper and vehicle superstructure. The energy dissipating element is formed by a hollow body having a U-shaped cross-section, with the legs of the U extending horizontally. The hollow body is filled with a synthetic foam material. This arrangement has disadvantage that the hollow body has a very small stiffness such that the legs of the hollow body are bent even after relatively small collision forces, whereby the energy dissipation through plastic deformation of the energy dissipating element is inadequate.

In order to minimize the disadvantages of the above-mentioned arrangement, it has been contemplated (DT-OS 1816 428) to provide rectangularly shaped hollow supports which exhibit an S-shaped pattern and which are filled with foam as energy absorbing elements. This arrangement is disadvantageous in that the supports are primarily stressed in bending and therefore take up relatively little travel and force dissipation through the S-shaped configuration.

The present invention is directed to an improved arrangement which overcomes the above-described disadvantages. The present invention is particularly directed to a collision energy dissipation apparatus or device which absorbs collision forces by a combination of high energy absorption over a substantially long deformation path. The present invention also provides a simple construction which can be easily manufactured and which can be matched to varying vehicle superstructure arrangements.

The present invention contemplates a collision energy dissipation apparatus that includes at least two tube elements forming one or more hollow spaces internally thereof, which are filled with deformable foam material. A first of these tubes is a support tube which is filled with the foam and a second of the tubes is constructed as a mantle tube surrounding the support tube. The support tube and mantle tube are connected with each other so as to optimize the supporting function of both tubes and so as to optimize the energy dissipation during deformation of the tube members in the event of a collision force acting in the longitudinal direction of the tubes.

In preferred embodiments of the present invention, the support tube consists of a circular-cylindrical cross-section tube and the mantle tube is constructed as a polygonal cross-section tube, preferably a four-sided tube. The support tube and mantle tube contact one another along lines formed by the intersection of the planes forming the sides of the mantle tube and the outer surface of the support tube. The support tube and mantle tube are then connected with each other along these lines preferably by means of welding or gluing.

In another preferred embodiment of the invention, the support tube and mantle tube are connected with each other by interengaging form-locking impressions. That is, the wall of the support tube for the foam material and the walls of the mantle tube include interengaging projections and recesses for formed-lockingly connecting the tubes to one another.

In another preferred embodiment of the present invention, the mantle tube is made up of a plurality of conical segments which are telescopically arranged with respect to one another. In this embodiment, the smallest inner diameter of the conical segments of the mantle tube are only slightly larger than the outer diameter of the support tube so as to accommodate relative movement of the conical segments during a collision with a resultant absorption of collision forces by both plastic deformation and by sliding friction between the respective conical segments, while still maintaining the conical segments in a position surrounding the support tube so as to support and guide the same during collisions.

In each of the above-mentioned preferred embodiments, closing parts are provided at the ends of the support tubes and mantle tubes so as to assure simultaneous compression of both the mantle and support tubes during collisions. These closing parts are preferably detachably connected to the mantle tubes and support tubes so as to facilitate assembly and disassembly thereof.

The above-mentioned preferred embodiments of the present invention are advantageous in that, through the support tube and mantle tubes, and the filling of the support tube with synthetic foam material, an arrangement is provided which, under loading in the axial direction of the tube members, absorbs high energies over a very long deformation travel path. Further, the arrangements of the present invention have such a characteristic that a continuous increase of the energy dissipation over the length of the travel path is obtained, while also providing for a controlled compression of the foam material. Also, during the dissipation of energy by the arrangement of the present invention, a controlled wrinkling of the support tube and the mantle tube is obtained due to the orientation of the support tube and mantle tube and the connection of the tubes to one another.

In the embodiment of the invention which utilizes conical segments for the mantle tube, the support tube will absorb forces in an axial direction through compression of the foam and the support tube, while the mantle tube will dissipate energy in the form of sliding friction work between the adjacent conical segments, as well as expansion work associated with the expansion of the conical segments during the application of compression forces thereon.

The arrangements of the present invention are also advantageous in that the energy dissipation apparatus can be adapted to different vehicle body structural variations by means of simple measurements due to the simplicity of the telescoping tube apparatus and the provision of detachable connections with the closing plate members, which closing plate members can also form parts of the vehicle body superstructure. Also, by appropriately changing the cross-sectional configuration of the tube elements, one can accommodate the energy dissipation apparatus to various vehicle body configurations.

These and further objects, features and advantages of the present invention will become more obvious from the following description when taken in connection with the accompanying drawings, which show, for purposes of illustration only, several embodiments in accordance with the present invention.

BRIEF DESCRIPTION OF THE DRAWINGS

FIG. 1 is a schematic partial-sectional view of a portion of a passenger motor vehicle which schematically illustrates the energy dissipation apparatus constructed in accordance with the present invention;

FIG. 2 is a sectional view taken along line II—II of FIG. 1, and showing the details of a first embodiment of the present invention;

FIG. 3 is a view similar to FIG. 2 showing details of a second embodiment of the present invention;

DETAILED DESCRIPTION OF THE DRAWINGS

Figure 4:
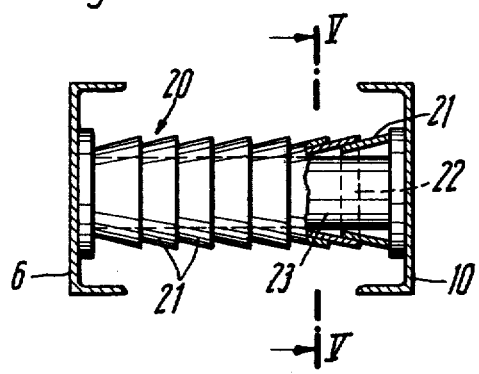
FIG. 4 is a side partial cross-sectional view showing a further embodiment of the present invention.

The passenger vehicle 1 shown in FIG. 1 includes a body superstructure 2 with a hood 3 which is supported on hinges 4. In the forward section of the body structure 2 a bumper 5 is provided. Bumper 5 is held on a U-shaped girder 6 of the body by a self-adjustable telescoping damper 7. The telescopic damper 7 is designed for accommodating small collision impact forces, for example, those resulting from collisions of the vehicle at speeds up to twice pedestrian walking speeds, without damage to the vehicle parts. Between the bumper 5 and an apron 8 and hood 3, elastic sections 9, 9' are provided which absorb relative motions between the body structure portions and the bumper.

Opposite the girder 6, a further U-shaped girder 10 forming part of the body structure is arranged such that the open sides of the girders 6 and 10 face one another.

Between girders 6 and 10, a device 11 extends which absorbs high collision impact energy quantities. This device is constructed with two tube elements in surrounding relationship with the inner tube being a support tube 12 and the outer tube being a mantle tube 13. The support tube 12 is provided with a circular cross-section and is filled with a synthetic foam material 14 which possesses characteristics accommodating energy dissipation upon compression thereof. The mantle tube 13 is formed with a square cross-section with the side surfaces 15 being of equal length.

The mantle tube 13 and the support tube 12 are dimensioned such that they touch each other along lines lying in the planes A—A and B—B. In the planes A—A and B—B, the support tube 12 and mantle tube 13 are connected with one another by welding, preferably by spot-welding (see FIG. 1 for the resultant wrinkling F of the outer mantle tube 13), gluing or the like.

The embodiment according to FIG. 3 is similar to the embodiment of FIG. 2 except that the mantle tube 13' and support tube 12' are connected with one another through interengageable form-locking portions thereof. These form-locking portions 16 connect the respective tubes 12' and 13' in the planes A'—A' and B'—B'. These impressions 16 are preferably spaced from one another along the length of the tubes so as to further facilitate the wrinkling effect during impact forces. However, other preferred embodiments of the invention include impressions 16 which extend along the length of the respective tubes.

As best illustrated in FIG. 1, the support tubes 12, 12' and the mantle tubes 13, 13' are connected to one another by way of closing portions 17, 18. These closing portions 17, 18 serve simultaneously for the fastening of the tubes to the girders 6 and 10 and for the connection of the tubes to one another at each of the respective end faces thereof. For the fastening to the girders 6 and 10, threaded screw elements 19 are provided.

In order to aid in the proper functioning of the bumper 5, the telescope damper 7 and the device 11 are arranged in a common plane of action D—D which extends in the vehicle longitudinal direction, which in turn extends essentially parallel to the drive path of the vehicle.

If a high collision impact energy force is initiated at the bumper 5 and is passed on to the device 11 (indirectly or directly), the support tube 12, 12' and the mantle tube 13, 13' are stressed in an axial direction and the foam material 14 is compressed. As a result, energy is dissipated through the deformation work of the tubes causing a tightly joining wrinkling F (FIG. 1). Girder 6, after the energy dissipation, assumes the position G shown in dot and dash lines in FIG. 1. Since the tubes mutually guide and support one another, a very large energy dissipation is possible by way of this wrinkling F, as compared with arrangements permitting bending deformation of the support members for the foam material, which bending deformation provides minimal energy dissipation since it takes place only along a single, or a very few, bend lines or planes.

Figure 5:
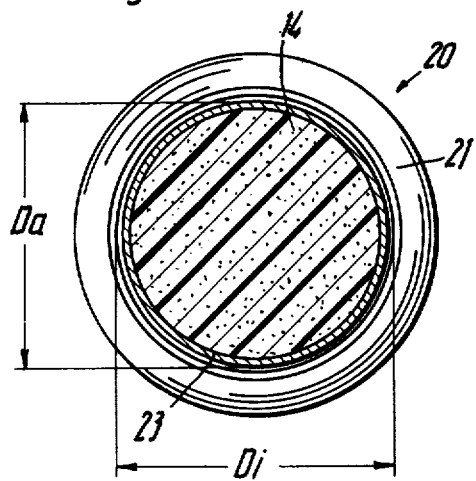
FIG. 5 is an enlarged partial sectional view taken along line V—V of FIG. 4.

In the embodiment illustrated in FIGS. 4 and 5, the mantle tube 20 is constructed with a plurality of conical segments 21. These segments 21 include telescoping portions 22. The smaller inner diameter $Di$ of the segments is only slightly larger than the outer diameter $Da$ of the support tube 23. In a manner similar to that described above for the embodiments of FIGS. 1 to 3, the embodiment of FIG. 4 is collapsed by movement of girder member 6 toward girder member 10, with a consequent energy dissipation due to the sliding friction between the respective conical segments 21 and due to the plastic deformation of the foam material and the respective support tube 23 and segments 21 of the mantle tube.

Preferred arrangements of the present invention can utilize a plurality of similar sets of devices 11 arranged across the width of the vehicle.

The present invention also contemplates nonillustrated embodiments with different cross-sectional configuration of the tube members, including circular support tubes and triangular cross-section mantle tube members otherwise similar to the FIGS. 2 and 3 embodiments. The present invention also contemplates preferred embodiments with three or more tube elements telescoped respectively into one another, with the resulting hollow spaces between the tubes being filled with foam material in a sandwich-type-construction, with the tube members appropriately connected to facilitate the energy dissipation also by the cooperating plastic deformation of the telescoped tube members in conjunction with the deformation of the foam.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Collision energy dissipation apparatus for a vehicle of the type having an end part and a relatively rigid vehicle frame structure spaced from the end part; said apparatus comprising:

first tube element means disposed between the end part and the frame structure, second tube element means disposed between the end part and the frame structure in surrounding relationship to said first tube element means, and plastically deformable foam means disposed inside of a hollow space formed inside of said tube element means, wherein said foam means and said first and second tube element means are configured for dissipating collision energy forces acting on said end part in a direction toward said frame structure by plastic deformation of said foam means and by plastic deformation of said tube element means while at least portions of said first and second tube element means move relative to one another.

2. Apparatus according to claim 1, wherein said vehicle is a wheeled passenger vehicle which includes a passenger space at the side of said frame structure facing away from said end part.

3. Apparatus according to claim 2, wherein said hollow space is formed inside of said first tube element means, and wherein said second tube element means is connected with outwardly facing exterior surface portions of said first tube element means such that said second tube element means aids in guiding and supporting said first tube element means during plastic deformation of said foam means.

4. Apparatus according to claim 3, wherein said first tube element means is a hollow tube of circular cross-sectional configuration, and wherein said second tube element means is a hollow tube of polygonal cross-sectional configuration.

5. Apparatus according to claim 4, wherein said second tube element means is a hollow tube of square cross-sectional configuration.

6. Apparatus according to claim 4, wherein said first and second tube element means contact one another along lines which bisect the respective sides of the second tube element means.

7. Apparatus according to claim 6, wherein said second tube element means is a hollow tube of square cross-sectional configuration.

8. Apparatus according to claim 7, wherein said first and second tube element means are connected with one another along said lines which bisect the respective sides of the second tube element means.

9. Apparatus according to claim 8, wherein said first and second tube element means are connected with one another along said lines by one of gluing and welding.

10. Apparatus according to claim 8, wherein said first and second tube element means are connected with one another along said lines by interengaging form-locking portions of the respective walls of said tube element means.

11. Apparatus according to claim 6, wherein said first and second tube element means are connected with one another along said lines which bisect the respective sides of the second tube element means.

12. Apparatus according to claim 11, wherein said first and second tube element means are connected with one another along said lines by one of gluing and welding.

13. Apparatus according to claim 11, wherein said first and second tube element means are connected with one another along said lines by interengaging form-locking portions of the respective walls of said tube element means.

14. Apparatus according to claim 11, wherein closing parts are provided for closing off and connecting the respective opposite end faces of said tube element means such that said first and second tube element means maintain similar lengths with respect to one another during plastic deformation thereof in response to said collision forces.

15. Apparatus according to claim 14, wherein a first of the closing parts forms part of said frame structure, and wherein a second of said closing parts is disposed at the end of the tube element means which faces said end part, said second closing part being movable toward said first closing part in response to said collision forces.

16. Apparatus according to claim 3, wherein said second tube element means is formed of a plurality of telescoping conical segments.

17. Apparatus according to claim 16, wherein the smallest inside diameter of each of said conical segments is only slightly larger than the outside diameter of said first tube element means such that said conical segments can dissipate said collision forces by frictional sliding engagement with one another while also serving to guide and support said first tube element means.

18. Apparatus according to claim 17, wherein closing parts are provided for closing off and connecting the respective opposite end faces of said tube element means such that said first and second tube element means maintain similar lengths with respect to one another during plastic deformation thereof in response to said collision forces.

19. Apparatus according to claim 18, wherein a first of the closing parts forms part of said frame structure, and wherein a second of said closing parts is disposed at the end of the tube element means which faces said end part, said second closing part being movable toward said first closing part in response to said collision forces.

20. Apparatus according to claim 2, wherein closing parts are provided for closing off and connecting the respective opposite end faces of said tube element means such that said first and second tube element means maintain similar lengths with respect to one another during plastic deformation thereof in response to said collision forces.

21. Apparatus according to claim 20, wherein a first of the closing parts forms part of said frame structure, and wherein a second of said closing parts is disposed at the end of the tube element means which faces said end part, said second closing part being movable toward said first closing part in response to said collision forces.

22. Apparatus according to claim 21, wherein each of said closing parts has a U-shaped channel member which has the legs of the U facing the other of the closing parts in surrounding relationship to the end portions of said tube element means.

23. Apparatus according to claim 21, wherein said second closing part is connected to said end part by an automatically returnable damper means.

24. Apparatus according to claim 23, wherein said end part is a vehicle bumper, and wherein said damper means is a telescoping shock-absorber.

25. Apparatus according to claim 24, wherein each of said closing parts extend transversely of the travel direction of the vehicle for accommodating a plurality of sets of first and second tube element means and associated foam means.

26. Apparatus according to claim 1, wherein said hollow space is formed inside of said first tube element means, and wherein said second tube element means is connected with outwardly facing exterior surface portions of said first tube element means such that said second tube element means aids in guiding and supporting said first tube element means during plastic deformation of said foam means.

27. Apparatus according to claim 26, wherein said first tube element means is a hollow tube of circular cross-sectional configuration, and wherein said second tube element means is a hollow tube of polygonal cross-sectional configuration.

28. Apparatus according to claim 1, wherein closing parts are provided for closing off and connecting the respective opposite end faces of said tube element means such that said first and second tube element means maintain similar lengths with respect to one another during plastic deformation thereof in response to said collision forces.

* * * * *